US005336953A

United States Patent [19]

Allemann

[11] Patent Number: 5,336,953
[45] Date of Patent: Aug. 9, 1994

[54] BATTERY-POWERED ELECTRICAL HAND-TOOL

[75] Inventor: Markus Allemann, Zuchwil, Switzerland

[73] Assignee: Scintilla AG, Solothurn, Switzerland

[21] Appl. No.: 994,135

[22] Filed: Dec. 21, 1992

[30] Foreign Application Priority Data

Dec. 21, 1991 [JP] Japan ................................. 4-142699

[51] Int. Cl.$^5$ ............................................ H02K 7/14
[52] U.S. Cl. ........................................ 310/50; 173/217
[58] Field of Search ........................... 310/50; 173/217

[56] References Cited

U.S. PATENT DOCUMENTS

| | | | |
|---|---|---|---|
| 3,186,878 | 1/1965 | Filander | 429/97 |
| 3,999,110 | 12/1976 | Ramstrom et al. | 320/2 |
| 4,525,079 | 6/1985 | Schmidt | 368/276 |
| 4,751,452 | 6/1988 | Kilmer et al. | 320/3 |
| 4,930,583 | 6/1990 | Fushiya et al. | 173/109 |
| 5,054,563 | 10/1991 | Zapf | 173/163 |

FOREIGN PATENT DOCUMENTS

| | | |
|---|---|---|
| 387688 | 1/1924 | Fed. Rep. of Germany . |
| 8628481 | 1/1987 | Fed. Rep. of Germany . |
| 3902442 | 8/1989 | Fed. Rep. of Germany . |
| 2461431 | 1/1981 | France . |

Primary Examiner—Steven L. Stephan
Assistant Examiner—Judson H. Jones
Attorney, Agent, or Firm—Michael J. Striker

[57] ABSTRACT

A battery-powered hand-tool, such as a battery-powered drill, battery-powered screwdriver or the like, has a tool mechanism housing, advantageously having a connected handle in one piece with the tool mechanism housing, a battery housing and an effective locking connection device for locking the battery housing together with the tool mechanism housing. The locking connection device has lock elements on the tool mechanism housing, which engage under suitable lock catches on opposite side walls of the battery housing. To provide a simplified structure for the lock connection device which permits an easy and economical manufacture of the hand-tool, the lock elements include a resilient U-shaped clasp member mounted on tool mechanism housing. The lock catches engage over both U-legs in the locked state of the locking connection means.

19 Claims, 4 Drawing Sheets

BATTERY-POWERED ELECTRICAL HAND-TOOL

BACKGROUND OF THE INVENTION

The present invention relates to a battery-powered hand-tool, such as a battery-powered screwdriver, battery-powered drill or the like.

A battery-powered hand tool is known comprising a tool mechanism housing having a connected handle, advantageously in one piece with the tool mechanism housing, a battery housing or container and an effective locking connection means for locking the battery housing together with the tool mechanism housing, which comprises lock elements on the tool mechanism housing, which engage under corresponding lock catches on opposing side walls of the battery housing.

In a known battery-powered screwdriver of this type the battery housing, also called the Power-pack, is mounted on a side of the tool mechanism housing remote from the drill chuck. The battery housing together with the tool mechanism housing provides a smooth handle surface. A pivotable plate, which is connected with a lock catch, is provided on each of two opposite longitudinal sides on the battery housing. The lock catches protrude in an attachment direction of the battery housing on the tool mechanism housing beyond the battery housing and there have detent elements which engage in recesses in the machine housing under a spring force. To take the battery housing from the tool mechanism housing both pivotable plates are pressed in so that the lock catches are pivoted against the spring force out from the recesses.

SUMMARY OF THE INVENTION

It is an object of the present method to provide a battery-powered hand-tool, which is improved in relation to the battery-powered hand-tool described above.

This object, and others which will be made more apparent hereinafter, is attained in a battery-powered hand-tool comprising a tool mechanism housing, advantageously having a connected handle in one piece with the tool mechanism housing, a battery housing or container and an effective locking connection means for locking the battery housing together with the tool mechanism housing. The locking connection means comprises lock elements on the tool mechanism housing, which engage under suitable lock catches on opposite side walls of the battery housing.

According to the invention, the lock elements comprise a resilient U-shaped clasp member having two U-legs mounted on tool mechanism housing. The lock catches engage over both U-legs in the locked state of the locking connection means.

The locking connection means according to the invention has the advantage of a simple structure, which allows an easy method of manufacturing the battery housing and thus a reduction of manufacturing costs. The resilient clasp member made as a separate component is inexpensive and previously required springs acting on the lock catches for automatic locking of the locking connection means can be eliminated. The shift according to the invention of the means for providing the spring forces for locking the locking connection means from the lock catches on the lock elements or clasp member in the tool mechanism housing allows the lock catches to be extruded or molded at the same time with the battery housing made from plastic material, which leads to a considerable reduction in manufacturing costs. Since the tool mechanism housing is usually formed in two housing pieces or shells, the clasp members can be applied at the same time as the assembly of both housing pieces. Because of that, the screwing together of both housing pieces, which would be required otherwise, can be eliminated.

In a preferred embodiment of the invention means for release of the battery housing from the tool mechanism housing when the battery housing is connected to the tool mechanism housing are provided and the resilient U-shaped clasp member is structured so that the battery housing can be released from the tool mechanism housing when the locking connection means is in the locked state.

The resilient U-shaped clasp member is structured to be held in the tool mechanism housing so that both of the housing pieces are releasably held together by the resilient U-shaped clasp member.

A wire clip can advantageously be used as the resilient clasp member. The clasp member can however be made from other materials, which guarantee that the clasp member has a certain elasticity because of its U-shape structure, so that the U-leg of the clasp member can be pressed interiorly on application of a suitable transverse force and returns again into its initial position after release from the transverse force.

In a preferred embodiment of the invention an interior longitudinal grooves is provided interiorly in each housing piece of a two-piece tool mechanism housing with groove openings facing each other and the housing is also provided with an exterior transverse groove extending across both housing pieces. The clasp member is dimensioned so that the U-legs are received in each of the interior longitudinal grooves and a connecting piece of the clasp member which connects the U-legs rests in the exterior transverse groove. The interior recesses are provided in the housing parts in the vicinity of the grooves so that a section of the U-legs of the clasp members is freely accessible so that the lock catches provided with lock detents can enter between the freely accessible U-leg sections and the interior wall of the housing pieces.

Advantageously two lock catches with lock detents each having a bevel surface are provided spaced from each other on each housing side of the battery housing and a release member is arranged between the two lock catches, which is substantially flush with the associated lock catches and extends at least up to the bevel surfaces. When the battery housing is connected to the tool mechanism housing thus the front sides of the lock catches can be pushed between the interior wall of the housing pieces of the tool mechanism housing and the freely accessible section of the U-legs of the clasp member so that the bevel surfaces of the lock catches force the U-legs interiorly. After the bevel surfaces pass by the U-legs the U-legs move back under transverse surfaces of the lock detents, so that the battery housing is locked with the tool mechanism housing. To open the lock connection device both release members must be pushed in which pivots the U-legs interiorly so that they move out from the lock detents. The lock detents are thus released from the U-legs of the lock clasp and the battery housing can be removed from the tool mechanism housing.

To bound the inward displacement of the release members and thus the displacement of the U-legs of the clasp member in an advantageous embodiment of the invention inclined walls are provided, each of which extends between the two lock catches on one side of the battery housing. The inclined walls are set back from the lock catches and advantageously are in one-piece with the lock catches.

In another advantageous embodiment of the invention the battery housing is in two pieces and has a lower case-like housing part and an upper plate-like housing part. The upper housing part is attached to the upper housing part, e.g. by welding, adhesive means, casting or the like.

The lock catches and the inclined walls are advantageously formed on the upper housing part of the battery housing so that the lock catches extend toward the lower housing part to the ends of the lock catches and the inclined walls extend between both lock catches up to their free ends. The release members are formed by portions of the side wall of the lower housing part and wall openings are provided on both sides of the release members for receiving the lock catches in the side walls. A battery housing with a smooth outer surface without protrusions or depressions can be obtained because of these features.

BRIEF DESCRIPTION OF THE DRAWING

The objects, features and advantages of the resent invention will now be illustrated in more detail by the following detailed description, reference being made to the accompanying drawing in which.

DETAILED DESCRIPTION OF THE INVENTION

Figure 1:
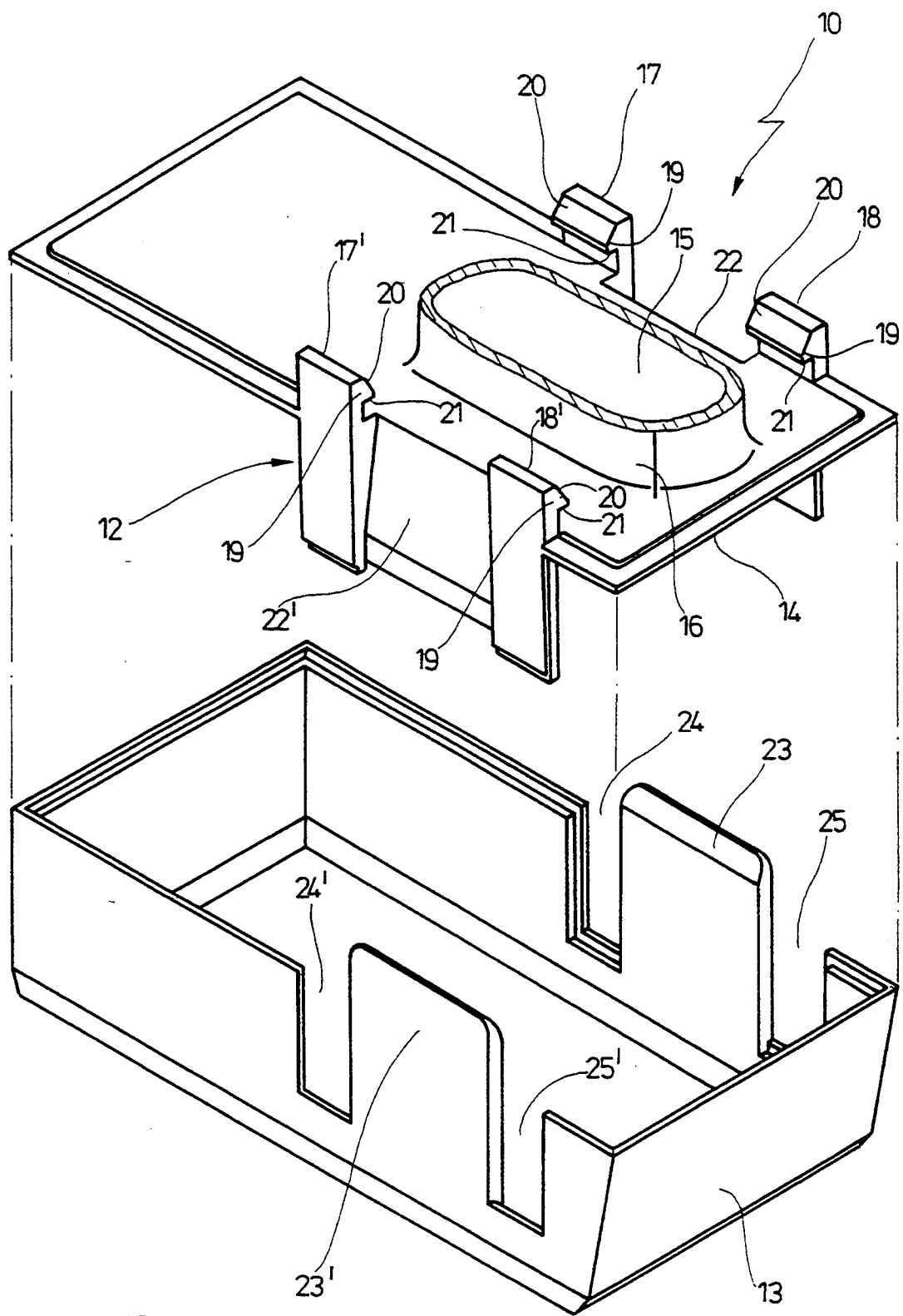
FIG. 1 is an exploded perspective view of a battery housing for a battery-powered hand-tool.
Figure 3:
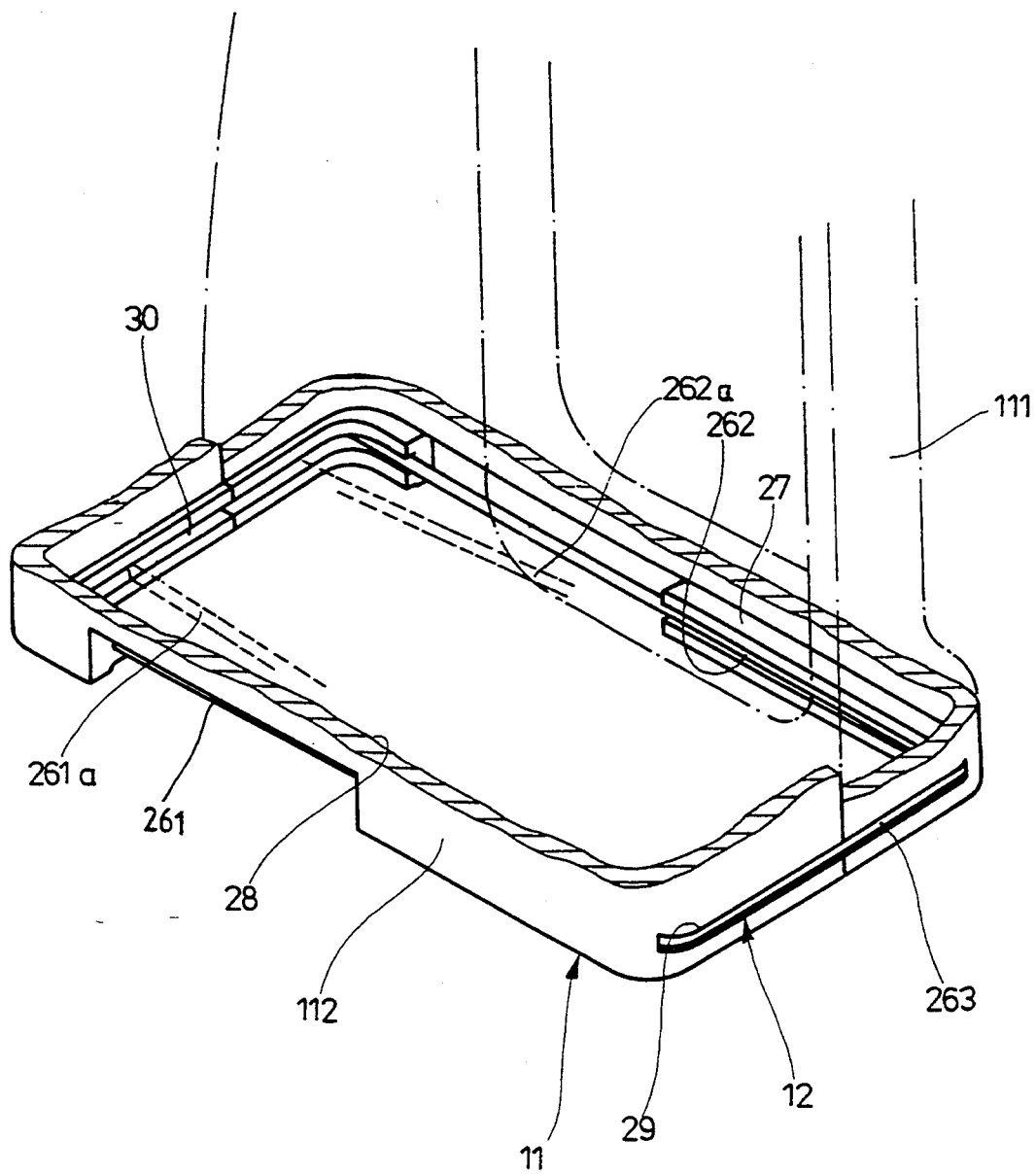
FIG. 3 is a cutaway perspective view of the part of the tool mechanism housing connected to the battery housing of FIG. 1 showing the locking connection means in the locked state.

The battery housing 10, also known as the power-pack, shown in FIG. 1 in exploded perspective view is part of a battery-powered electrical hand-tool, such as a battery-powered screwdriver, battery-powered drill or the like, whose associated tool mechanism housing 11 is shown in FIG. 3. The battery housing 10 is attached to the rear side of the tool mechanism housing 11 made of two housing pieces 111,112. The battery housing 10 shown in FIG. 1 must be rotated 180° about a vertical axis passing through it prior to attachment to the tool mechanism housing 11. On attachment of the battery housing 10 to the tool mechanism housing 11 automatically a still to be described locking connection is made by a locking connection means 12, so that the battery housing 10 is reliably secured to the tool mechanism housing 11.

As shown in FIG. 1, the battery housing 10 is divided into two parts and comprises a lower case-like housing part 13 and an upper plate-like housing part 14. The upper housing part 14 is mounted on the lower housing part 13 to close the battery housing. In the upper housing part 14 an elliptical opening 15 is provided, which is enclosed by a hollow support 16, which is shown in the individual figures only in cross-section. The individual cylindrical battery cells are inserted upright in the hollow support 16. These battery cells are supported on unshown contact elements at the bottom of the lower housing part 13. The hollow support 16 is closed at an upper end thereof with a one-piece, unshown cover, which contains an opening through which electrical contacts are fed. After insertion of the battery cells both housing parts 13 and 14 are closed and connected solidly with each other, for example by welding, gluing, casting or the like.

The locking connection means 12 between the battery housing 10 and the tool mechanism housing 11 comprises lock catches 17,18 and/or 17',18' of the battery housing 10 and a lock element mounted on the tool mechanism housing 11 which is engaged by the locking catches when the locking connection has been made Two lock catches 17,18 and/or 17',18' are provided spaced from each other on each opposing longitudinal side of the upper housing part 14 of the battery housing 10, which protrude in the attachment direction of the battery housing 10 toward the machine housing 11 beyond the upper plate-like housing part 14. Each lock catch 17,18,17'18' carries an interiorly directed lock detent 19 in its protruding region, which has a bevel surface 20 and tapers toward the end of the lock detent 19 and on its side closest to the upper housing part 14 has a transverse surface or side surface 21. The lock catches 17,18 and/or 17'18' protrude downwardly also toward the lower housing part 13 and are connected with each other in this region by an inwardly set back inclined wall 22 and/or 22'. The inclined wall 22 and/or 22' extends from the lower end of the lock catches 17,18 and/or 17',18' up to the upper edge of the upper housing part 14, so that the upper end of the inclined wall 22 and/or 22' is set back further relative to the lower end in the housing part 14.

Release members 23,23' are provided opposite each other on lower box-like housing parts 13, which are formed by portions of the lateral walls of the lower housing part 13 of the battery housing. A wall opening 24,25 and/or 24',25' for receipt of the lock catches 17,18 and/or 17',18' is provided on each side of each of the release members 23,23'. The width dimension of the release members 23 and 23' thus corresponds to the width dimension of the inclined wall 22 and/or 22' in the upper housing part 14 and the width of the wall openings 24,25 and/or 24',25' in the upper housing part 14 corresponds to the width of the lock catches 17,18 and/or 17',18'. On putting the upper housing part 14 on the lower housing part 13 the lock catches 17,18 and/or 17'18' fit with their downwardly directed portions in the wall openings 24,25 and/or 24',25' flush with the adjoining portions of the wall of the lower housing part 13. Both release members 23,23' cover the inclined walls 22 and/or 22'. As can be seen from FIG. 2 and 4, the release members 23,23' extend up to the upper ends of the lock catches 17,18 and/or 17',18' and must however extend at least beyond the transverse surface of the lock detents. The inclined walls 22,22' serve to bound the resilient displacement of the release members 23,23', which can be pressed interiorly up to the inclined walls 22,22' by engagement with two fingers. The lock detents 17,18 and/or 17',18' and the inclined walls 22 and/or 22' in one piece with them are similarly made in one piece with the upper housing part like the hollow support 16 and are extruded in the same manufacturing process.

The lock element of the locking connection means 12 for locking of the lock catches 17,18 and 17′,18′ comprises an elastic U-shape clasp member 26, which is formed here as a wire clip 26. As shown in FIG. 3, the wire clip 26 is inserted on to the tool mechanism housing 11 from the outside and is held there axially fixed. Two interior longitudinal grooves 27,28 with their openings opposite each other (the interior groove 28 is not seen in FIG. 3, because of the perspective view chosen in FIG. 3), are located in the longitudinal interior sides of the housing pieces 111 and/or 112 of the tool mechanism housing 11 in the housing interior.

Both interior longitudinal grooves 27,28 are connected with each other by an interior transverse groove 30 extending along the interior of one of the smaller sides of the tool mechanism housing 11 connecting the longitudinal interior sides. This interior transverse groove 30 extends over both housing pieces 111 and/or 112. An exterior transverse groove 29 extends on the outside of the smaller side of the tool mechanism housing 11 opposite to the side containing the interior transverse groove 30. This exterior transverse groove 29 also extends over both housing pieces 111 and/or 112. Throughgoing holes provided at the ends of the exterior transverse groove 29 connect the exterior transverse groove with and are aligned with the interior longitudinal grooves 27,28 so that the exterior transverse groove 29 is connected with the interior transverse groove 30 at both ends. The wire clip comprising the clasp member 26 is inserted with its U-legs 261,262 through the throughgoing holes of the exterior transverse groove 29 into the interior longitudinal grooves 27,28 until a connecting piece 263 connecting both U-legs 261,262 rests flush and fitting in the exterior transverse groove 29. The free ends of both U-legs 261,262 are received in the interior transverse groove 30. Both longitudinal grooves 27, 28 are omitted from the tool mechanism housing 11 in the vicinity of the lock catches 17,18 and/or 17′,18′ so that a leg section 261a,262a of each U-leg 261,262 is freely accessible and extends spaced from the interior wall of the housing pieces 111 and/or 112 so that the lock catches 17,18 and/or 17′,18′ are able to enter or be inserted between the freely accessible leg sections 261a,262b and the inner wall of the housing pieces 111 and/or 112.

Figure 2:
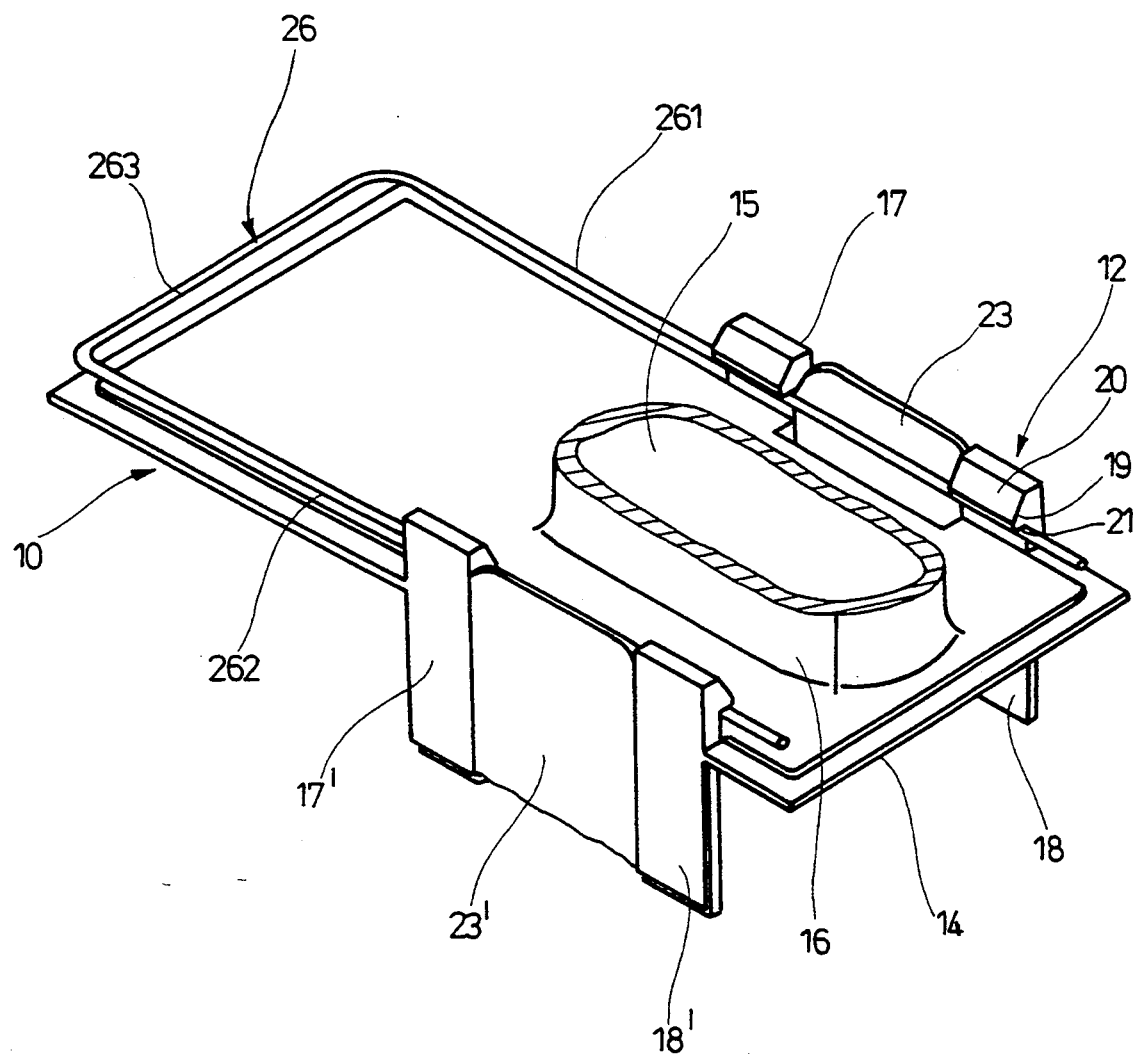
FIG. 2 is a perspective cutaway view of an upper portion of the battery housing shown in FIG. 1 and the locking connection means in the locked state.

When the battery housing 10 is attached to the tool mechanism housing 11, the lock catches 17,18 and 17′,18′ pass through the above-defined intervening space so that the bevel surface 20 of the lock catches 17,18 and/or 17′,18′ presses both U-legs 261,262 interiorly so that the free ends of the U-legs 261,262 are pushed inwardly in the interior transverse groove 30 (in FIG. 3 shown in dashed lines) until the lock detents 19 move past the U-legs 261,262. Then the resilient U-legs 261,262 return to their original position in the grooves and the transverse surfaces 21 of the lock detents 19 rest on them. This locked state of the locking connection means 12 is shown in FIG. 2, in which for clarification both the wire clip surrounding the tool mechanism housing 11 (see FIG. 3) and also the lower housing part 13 of the battery housing 10 (see FIG. 10 have been omitted.

Figure 4:
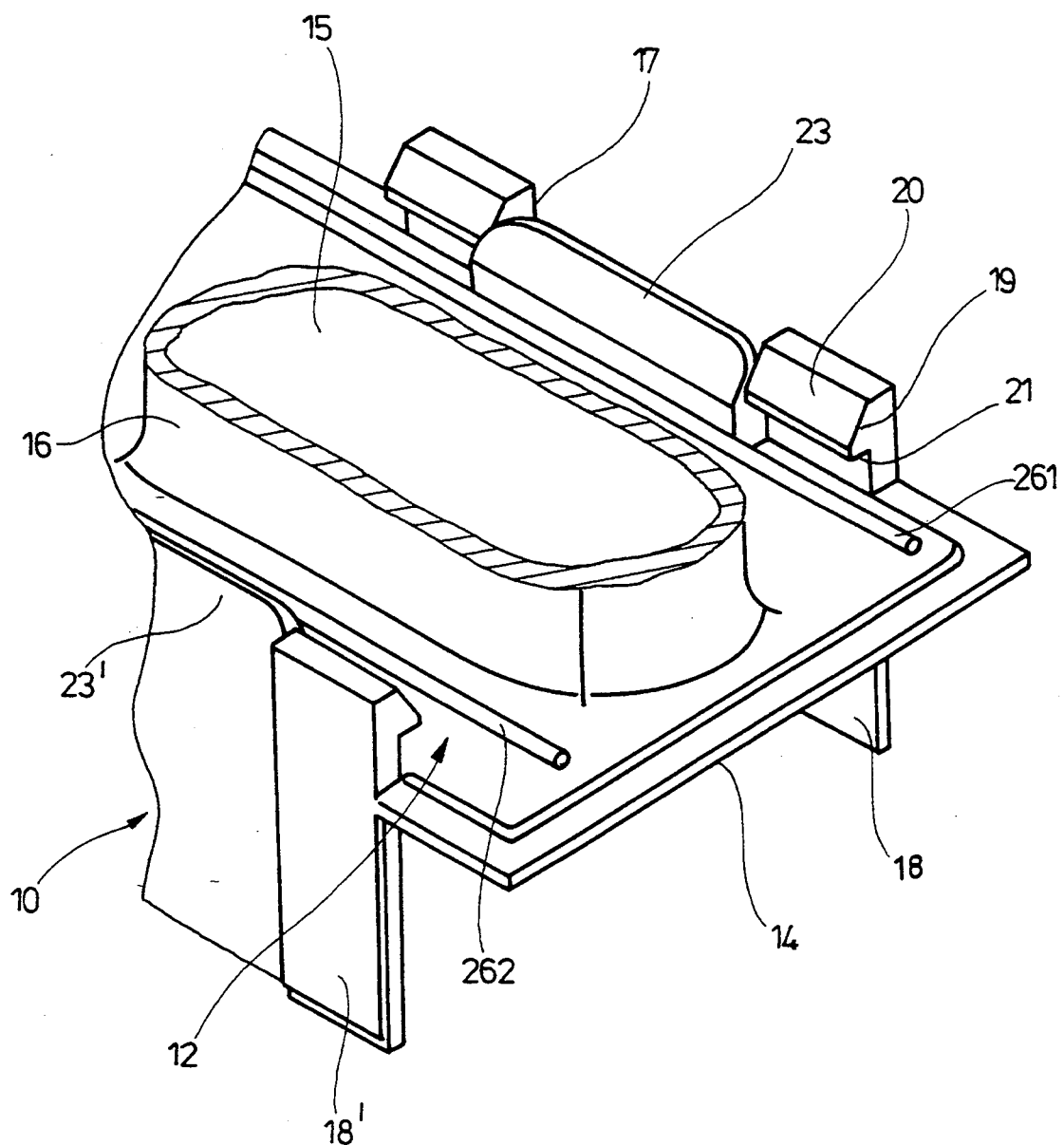
FIG. 4 is a cutaway perspective view of an upper part of the battery housing of FIG. 1 with the locking connection means in an unlocked state.

Should the battery housing 10 be again detached from the tool mechanism housing 11, both release members 23,23′ are engaged with two fingers and press interiorly the inclined wall 22,22′. The release members 23,23′ press interiorly and press the U-legs 261,262 of the wire clip 26 interiorly so that they are moved out of engagement with the lock detents 19 of the lock catches 17,18 and/or 17′18′. This unlocked state of the locking connection means 12 is shown in FIG. 4. Again the wire clip surrounding the tool mechanism housing 11 (see FIG. 3) and also the lower housing part 13 of the battery housing 10 (see FIG. 10) have been omitted to simplify the drawing. With the U-legs 261,262 pivoted out from the lock detents 19 the lock catches 17,18 and 17′18′ are released so that the battery housing 10 can be removed from the tool mechanism housing 11.

It will be understood that each of the elements described above, or two or more together, may also find a useful application in other types of structures differing from the types described above.

While the invention has been illustrated and described as being embodied in a battery-powered electrical hand-tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A batter-powered hand-tool comprising
a tool mechanism housing,
a battery housing,
an effective locking connection means for locking the battery housing together with the tool mechanism housing, said locking connection means comprising at least one lock element connected with the tool mechanism housing, said at least one lock element including a resilient U-shaped clasp member having two U-legs and a plurality of lock catches provided on opposite side walls of the battery housing, said lock catches engaging over the at least one lock element in a locked state of the locking connection means to connect the battery housing to the tool mechanism housing; and
means for release of the battery housing from the tool mechanism housing when the battery housing is connected to the tool mechanism housing, said means for release including said resilient U-shaped clasp member and being such that the battery housing can be released from the tool mechanism housing when the locking connection means is in the locked state.

2. A battery-powered hand-tool as defined in claim 1, wherein the tool mechanism housing comprises two housing pieces and the resilient U-shaped clasp member is structured to be held in the tool mechanism housing so that both of the housing pieces are releasably held together by the resilient U-shaped clasp member.

3. A battery-powered hand-tool as defined in claim 2, wherein the resilient U-shaped clasp member has a connecting piece connecting both of the U-legs and extending over both of the housing pieces, and at least one of the U-legs engages in one of the housing pieces and acts to press the housing pieces together.

4. A battery-powered hand-tool as defined in claim 3, wherein the U-shaped clasp member is mounted on the tool mechanism housing transversely to a connection direction of the battery housing to the tool mechanism housing; wherein each of the housing pieces is provided with an interior longitudinal groove in which one of the U-legs of the clasp member extends, the interior longitudinal grooves having groove openings facing each other in the tool mechanism housing; wherein the connecting piece of the clasp member is located in an exterior transverse groove provided in the tool mechanism housing in both of the housing pieces, and both of the housing pieces are provided with opposing interior recesses in the vicinity of the interior longitudinal grooves such that a section of each of the U-legs is freely accessible so that the lock catches can enter between the freely accessible portion of the U-legs and an interior wall of the housing pieces.

5. A battery-powered hand-tool as defined in claim 4, wherein the battery housing is provided with opposing housing sides and two of the lock catches spaced from each other on each of the housing sides, said lock catches protruding beyond the battery housing in said connection direction and each having a lock detent provided with a bevel surface engagable with one of the freely accessible portions of the U-legs during the connection of the battery housing with the tool mechanism housing; and the housing sides are each provided with a release member substantially flush with the lock catches and extending at least up to the bevel surface of the lock detents.

6. A battery-powered hand-tool as defined in claim 5, wherein the release members are resilient and the lock catches have exterior surfaces and wherein an inclined wall on each housing side extends between the lock catches on said housing side, said inclined wall is set back from the exterior surfaces of the lock catches, said inclined walls acting as stop means for displacement of the resilient release members.

7. A battery-powered hand-tool as defined in claim 5, wherein the lock catches with the lock detents with the bevel surfaces, the release members and the inclined walls are one-piece with the battery housing.

8. A battery-powered hand-tool as defined in claim 1, wherein the battery housing comprises a lower case-like housing part and an upper plate-like housing part attached together by one of welding, adhesive means and casting.

9. A battery-powered hand-tool as defined in claim 8, wherein the battery housing is provided with opposing housing sides and two lock catches spaced from each other on each of the housing sides, said lock catches protruding beyond the battery housing in said connection direction and each having a lock detent provided with a bevel surface engagable with the freely accessible section of respective ones of the U-legs when the battery housing is connected with the tool mechanism housing; the housing sides are each provided with a release member substantially flush with the lock catches and extending at least up to the bevel surface of the lock detents, and wherein the lock catches and the inclined walls are provided in the upper housing part of the battery housing, the lock catches extend toward the lower housing part remote from the lock detents, the inclined walls extend between the lock catches up to a free end of the lock catches, and the release members are part of the lower housing part of the battery housing and wall openings are provided in the housing sides on each said of the release member for receiving the lock catches.

10. A battery-powered hand-tool as defined in claim 9, wherein the inclined walls are in one-piece with the lock catches on each of the housing sides.

11. A battery-powered hand-tool as defined in claim 1, wherein the U-shaped clasp member comprises a wire clip.

12. A battery-powered hand-tool as defined in claim 1, wherein the tool mechanism housing has a handle.

13. A battery-powered hand-tool as defined in claim 12, wherein the handle is in one piece with the tool mechanism housing.

14. A battery-powered hand-tool comprising
a tool mechanism housing,
a battery housing,
a releasable locking connection means for releasably locking the battery housing together with the tool mechanism housing, said releasable locking connection means comprising a resilient U-shaped clasp member having two U-legs connected with the tool mechanism housing; a plurality of lock catches provided on opposite side walls of the battery housing, said lock catches engaging over the U-lets of the resilient U-shaped clasp member in a locked state of the locking connection means to connect the battery housing to the tool mechanism housing; and means for release of the battery housing from the tool mechanism housing when the locking connection means is in the locked state, said means for release including said U-legs of said resilient U-shaped clasp member.

15. A battery-powered hand-tool as defined in claim 14, further comprising means for release of the battery housing from the tool mechanism housing when the battery housing is connected to the tool mechanism housing and wherein the resilient U-shaped clasp member is structured so that the battery housing can be released form the tool mechanism housing when the locking connection means is in the locked state.

16. A battery-powered hand-tool as defined in claim 15, wherein the tool mechanism housing comprises two housing pieces and the resilient U-shaped clasp member is structured to be held in the tool mechanism housing so that both of the housing pieces are releasably held together by the resilient U-shaped clasp member.

17. A battery-powered hand-tool as defined in claim 16, wherein the resilient U-shaped clasp member has a connecting piece connecting both of the U-legs and extending over both of the housing pieces, and at least one of the U-legs engages in one of the housing pieces and acts to press the housing pieces together.

18. A battery-powered hand-tool as defined in claim 17, wherein the U-shaped clasp member is mounted on the tool mechanism housing transversely to a connection direction of the battery housing to the tool mechanism housing; wherein each of the housing pieces is provided with an interior longitudinal groove in which one of the U-legs of the clasp member extends, the interior longitudinal grooves having groove openings facing each other in the tool mechanism housing; wherein the connecting piece of the clasp member is located is an exterior transverse groove provided in the tool mechanism housing in both of the housing pieces, and both of the housing pieces are provided with opposing interior recesses in the vicinity of the interior longitudinal grooves such that a section of each of the U-legs is freely accessible so that the lock catches can enter between the freely accessible portion of the U-legs and an interior wall of the housing pieces.

19. A battery-powered hand-tool as defined in claim 18, wherein the battery housing is provided with opposing housing sides and two of the lock catches spaced from each other on each of the housing sides, said lock catches protruding beyond the battery housing in said connection direction and each having a lock detent provided with a bevel surface engageable with one of the freely accessible portions of the U-legs during the connection of the battery housing with the tool mechanism housing; and the housing sides are each provided with a release member substantially flush with the lock catches and extending at least up to the level surface of the lock detents.

* * * * *